(12) United States Patent
Herrmann

(10) Patent No.: US 9,185,884 B2
(45) Date of Patent: Nov. 17, 2015

(54) SYSTEM AND METHOD FOR ANIMAL CONTROL

(71) Applicant: Jazmyne A. Herrmann, Lafayette, CO (US)

(72) Inventor: Jazmyne A. Herrmann, Lafayette, CO (US)

(*) Notice: Subject to any disclaimer, the term of this patent is extended or adjusted under 35 U.S.C. 154(b) by 214 days.

(21) Appl. No.: 13/891,377

(22) Filed: May 10, 2013

(65) Prior Publication Data

US 2014/0331940 A1     Nov. 13, 2014

(51) Int. Cl.
*A01K 1/04* (2006.01)
*A01K 15/02* (2006.01)

(52) U.S. Cl.
CPC ..................... *A01K 15/02* (2013.01)

(58) Field of Classification Search
CPC .................................................. A01K 27/007
USPC ................................................ 119/775, 860
See application file for complete search history.

(56) References Cited

U.S. PATENT DOCUMENTS

| | | | | | |
|---|---|---|---|---|---|
| 4,627,385 | A | * | 12/1986 | Vinci | 119/718 |
| 5,980,496 | A | * | 11/1999 | Jacobsen et al. | 604/289 |
| 6,327,998 | B1 | * | 12/2001 | Andre et al. | 119/712 |
| 6,349,232 | B1 | * | 2/2002 | Gordon | 604/20 |
| 6,588,376 | B1 | * | 7/2003 | Groh | 119/860 |
| 6,668,760 | B2 | * | 12/2003 | Groh et al. | 119/718 |
| 7,992,525 | B1 | * | 8/2011 | Fisher | 119/860 |
| 2006/0037557 | A1 | * | 2/2006 | Gordon | 119/654 |
| 2009/0277973 | A1 | * | 11/2009 | Kennon | 239/13 |
| 2011/0030622 | A1 | * | 2/2011 | So | 119/719 |
| 2011/0232587 | A1 | * | 9/2011 | Levy et al. | 119/796 |

* cited by examiner

*Primary Examiner* — Kristen C Hayes

(57) ABSTRACT

A method for animal control includes receiving, at an animal control device, an indication of a direction. The method further includes converting, at the animal control device, the received indication of a direction to a command. The method further includes triggering, at the animal control device, at least a first scent discharge based on the command. The scent discharge includes a liquid mist having an odor that is distracting to at least a first animal.

4 Claims, 6 Drawing Sheets

FIG. 1 (BAD DOG)

SYSTEM AND METHOD FOR ANIMAL CONTROL

TECHNICAL FIELD

The present disclosure relates generally to animals, and more particularly to a system and method for animal control.

BACKGROUND

Animals, especially dogs, enjoy going for walks. Disobedient animals, especially larger animals, often end up pulling their owners on walks. In some cases, such animals may end up taking their owners for walks. If an animal is especially large and powerful, the owner may suffer injuries caused by the animal pulling on a leash.

SUMMARY

According to the present disclosure, disadvantages and problems associated with previous techniques for animal control may be reduced or eliminated.

In certain embodiments, a method for animal control includes receiving, at an animal control device, an indication of a direction. The method further includes converting, at the animal control device, the received indication of a direction to a command. The method further includes triggering, at the animal control device, at least a first scent discharge based on the command. The scent discharge includes a liquid mist having an odor that is distracting to at least a first animal.

Certain embodiments of the present disclosure may provide one or more technical advantages. Conventional animal control devices such as leashes offer little control over an animal. Owners desire more control over their animals, such as dogs on walks, and need a device to distract their animal in the event the animal gets out of control. In certain embodiments of the present disclosure, an animal control device is provided that may attach to an animal's collar and may trigger a scent discharge on command. The scent discharge includes a liquid mist that has an odor that is distracting to at least a first animal. Thus, at least one example advantage of the present disclosure includes scent-based control of an animal, such as a dog on a walk, which may lead to reduction in the number of injuries and frustrations caused by an out of control animal. A second example advantage of the present disclosure includes customizable scents. For instance, some animals may love the smell of fire hydrants while other animals may prefer the smell of cheese. A customizable scent cartridge may be implemented in the animal control device according to an animal's preferences, thus making the discharged scent more effective for different animals.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF EXAMPLE EMBODIMENTS

Figure 1:
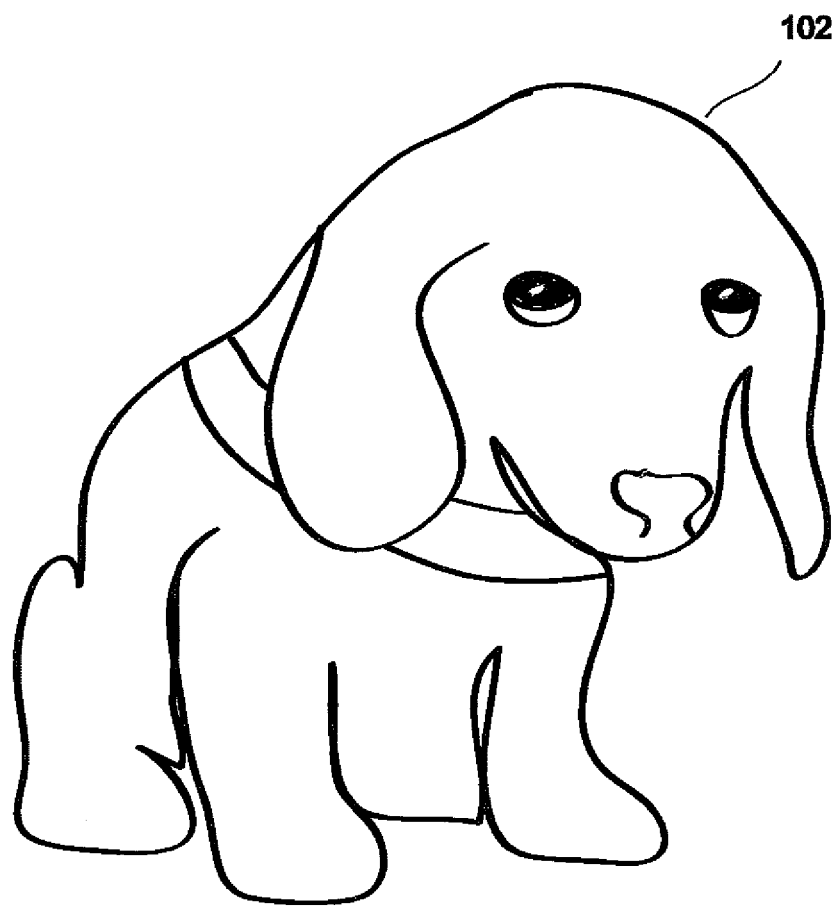
FIG. 1 illustrates an example animal, according to certain embodiments of the present disclosure.

FIG. 1 illustrates an example animal 102, according to certain embodiments of the present disclosure. In the illustrated embodiment, animal 102 is a dog and, in particular, a bad dog. Animal 102 may be a bad dog if the dog does not listen to verbal commands when taking walks. Animal 102 may be a bad dog if animal 102 is easily distracted by external stimuli. Animal 102 may be a bad dog if the dog has accidents in the house. In other embodiments, animal 102 may not be a bad dog and may be such a good dog.

Although animals, and more particularly dogs, are illustrated and primarily described in this disclosure, the present disclosure contemplates control over any other suitable living organism having a nervous system. For example, this disclosure contemplates control of many other organisms including tigers, llamas, cats, platypuses, bears, rabbits, sloths, monkeys, bats, snakes, and dolphins.

Figure 2:
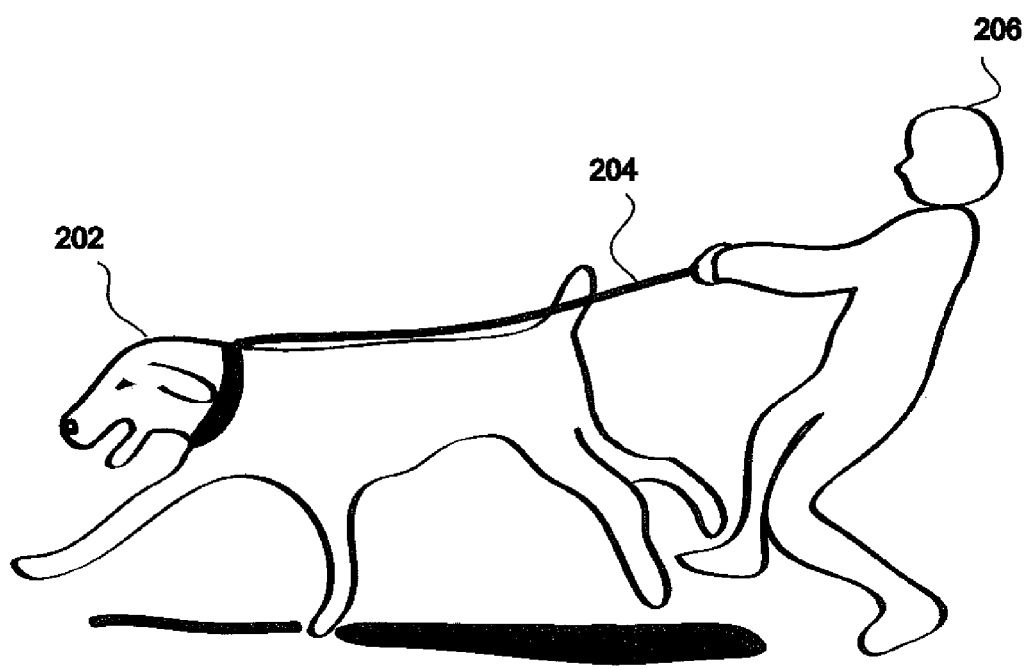
FIG. 2 illustrates an example animal on a leash pulling an owner, according to certain embodiments of the present disclosure.

FIG. 2 illustrates an example animal 202 on a leash 204 pulling an owner 206, according to certain embodiments of the present disclosure. Animal 202 may be substantially similar to animal 102 of FIG. 1. As shown in the embodiment, animal 202 is disobeying owner 206 and is pulling owner 206 behind. These events, referred to as animal pulling events in this disclosure, may be frustrating for owner 206 and, in some circumstances, potentially dangerous for animal 202 and owner 206.

Animal pulling events may be triggered by external stimuli. For example, animal 202 may desire to chase another dog. As another example, animal 202 may identify a squirrel and may need to get that squirrel. As yet another example, animal 202 may have picked up a scent trail. In each of the examples above, animal 202 may disobey commands from owner 206 such as "no," "stop," and "bad dog" and the pulling events may continue.

Figure 3:
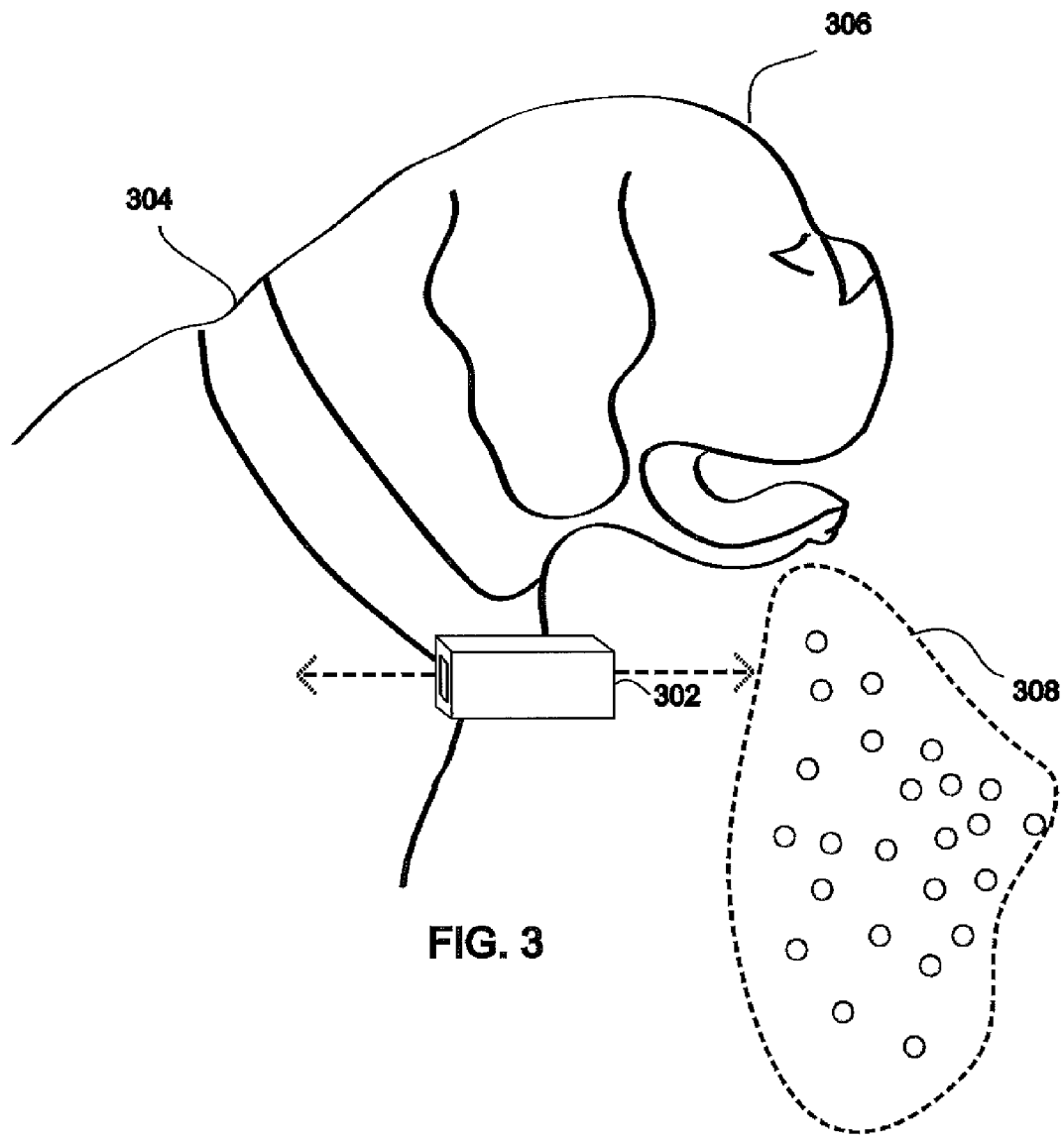
FIG. 3 illustrates one embodiment of an example animal control device, according to certain embodiments of the present disclosure.

FIG. 3 illustrates one embodiment of an example animal control device 302, according to certain embodiments of the present disclosure. Animal 202 may be substantially similar to animal 102 of FIG. 1 and animal 202 of FIG. 2. According to one embodiment, animal control device 302 is operable to receive an indication of a direction, convert the indication to a command, and trigger a scent discharge 308 based on the command.

Animal control device 302 may include any suitable hardware and/or software for receiving an indication of a direction. For example, animal control device 302 may receive an indication that an owner desires to direct animal 306 to turn to the left. As another example, animal control device 302 may receive an indication that an owner desires to direct animal 306 to turn to the right. As another example, animal control device 302 may receive an indication that an owner desires to direct animal 306 to look up, down, forward, or behind animal 306. Additional details of indications of a direction are provided below with reference to FIG. 4B.

Animal control device 302 may include any suitable hardware and/or software for converting an indication of a direction to a command. In certain embodiments, converting a received indication of a direction to a command may refer to translating the received indication of a direction into an electronic format suitable for processing by animal control device 302 to trigger a scent discharge in a direction that corresponds to the indication, as described in more detail below.

Animal control device 302 may include any suitable hardware and/or software for controlling animals by triggering a scent discharge 308. For example, as shown in the illustrated embodiment, animal control device 302 may include a box shaped device with one or more openings to facilitate triggering of scent discharge 308. As another example, animal control device 302 may include other device shapes and mechanisms for controlling animals using a scent discharge such as a squirt bottle, eye dropper, scent packet, liquid dispenser, tubes, pumps, and motors that are capable of triggering scent discharge 308. In short, animal control device 302 may include any suitable combination of software, firmware, and hardware used to support any animal control function and capable of triggering scent discharge 308. It should be noted that any suitable number of animal control devices 302 may be utilized. In addition, there may be multiple animal control devices 302 in and around collar 304 of animal 306.

According to one embodiment, scent discharge 308 may correspond to a direction indicated by an owner. In the illustrated embodiment, scent discharge 308 is discharged to a left side of animal 306 in order to divert, turn, or distract animal 306 in a left direction. In certain other embodiments, animal control device 302 may trigger a single scent discharge 308. In certain other embodiments, animal control device 302 may constantly trigger scent discharge 308 to create a stream of scent discharges. In certain embodiments, scent discharge 308 may be discharged in a direction to avoid other oncoming animals, as described in detail below with reference to FIG. 5C.

Scent discharge 308 includes any suitable liquid mist having an odor that is distracting to at least a first animal, according to certain embodiments of the present disclosure. A liquid mist may refer to any fine liquid droplets discharged at a velocity from any suitable mechanism such as pipes, ducts, stacks, and small tubing. In certain embodiments, scent discharge 308 may include an odor that is generally pleasing to the animal. Example pleasing odors to animals may include a bacon odor, a fire hydrant odor, a cheese odor, a pizza odor, a hamburger odor, a mail carrier odor, or a newspaper odor. In certain other embodiments, the odor may be one that is not attractive to an animal and may be effective in diverting the animal in an opposite direction of the odor. Example unattractive odors may include a skunk odor, a rhinoceros odor, a foot odor, and a burned hair odor. Although certain example odors are described above, the present disclosure contemplates any suitable odors for controlling an animal.

According to an example operation of animal control device 302, animal control device 302 may receive an indication of a direction. Next, animal control device 302 may convert the received indication of a direction to a command. Then animal control device 302 may trigger scent discharge 308 based on the command. Scent discharge 308 includes a liquid mist having an odor that is distracting to at least a first animal. In the illustrated embodiment, scent discharge 308 may direct the attention of animal 306 to the left and may turn animal 306 in that direction and/or avoid a pulling event from animal 306.

In the illustrated embodiment, animal control device 302 is attached to animal 306. Animal control device 302 may be attached to an animal using a variety of techniques. In certain embodiments, animal control device 302 may be connected to an animal collar. In certain other embodiments, animal control device 302 may be integrated with an animal collar.

Animal control device 302 may include one or more computing devices operable to receive, transmit, process, and store data and commands and trigger a scent discharge. For example, animal control device 302 may include one or more general-purpose PCs, Macintoshes, workstations, Unix-based computers, mini computers, one or more personal computing devices, or any other suitable devices. In certain embodiments, animal control device 302 may communicate remotely with a remote server if the owner would like to control the animal from a remote location. In short, animal control device 302 may include any suitable combination of software, firmware, and hardware. Additional details of an example device are described below with reference to FIG. 4A. Although a single animal control device 302 is illustrated, the present disclosure contemplates animal control device 302 including any suitable number of animal control devices 302.

Figure 4A:
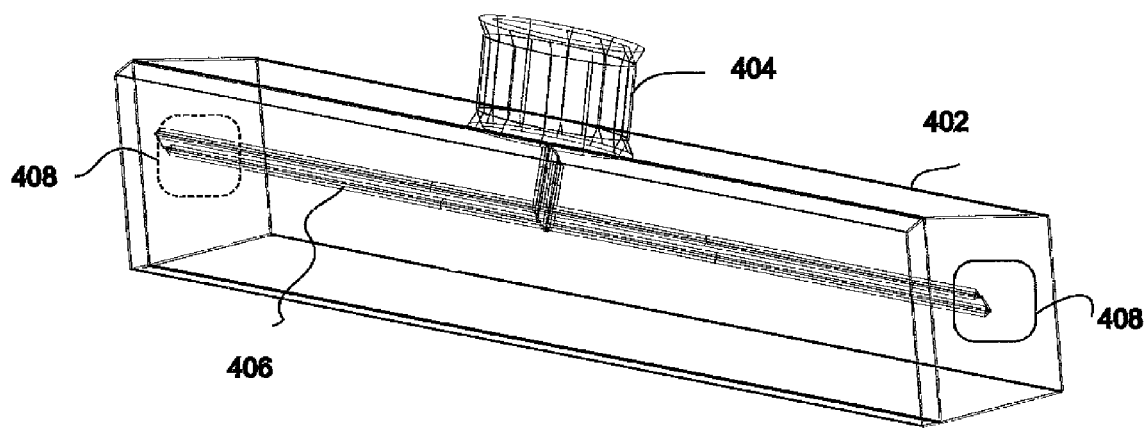
FIG. 4A illustrates one embodiment of an example animal control device, according to certain embodiments of the present disclosure.

FIG. 4A illustrates one embodiment of an example animal control device 402, according to certain embodiments of the present disclosure. In the illustrated embodiment, animal control device 402 includes a removable cartridge 404 connected to discharge tubes 406, which are connected to openings 408. According to one embodiment, cartridge 404 may include one or more liquid that when discharged through openings 408 result in a liquid mist having an odor as described above. In one example of operation of animal control device 402, the liquid from cartridge 404 may be transmitted from cartridge 404 through tubes 406 to an appropriate opening 408 and, therefore, discharged in an appropriate direction. In certain embodiments, the scent discharge and transmission through a selected one or more of openings 408 may be triggered based on a received indication of a direction, which is converted to a command by animal control device 402 as described above.

In certain embodiments, animal control device 402 may be an electronic computing device that includes a storage device, a communication interface, a processor, a memory, an output device, and an input device, which are discussed in further detail below. The storage device may include any suitable device operable for storing data and instructions. The storage device may include, for example, a magnetic disk, flash memory, optical disk, or other suitable data storage device. The communication interface may include any suitable logic embodied in computer-readable media, and when executed, that is operable to receive, parse, interpret, convert, and translate indications of direction received from an animal communication interface to a command, as described in detail below with reference to FIG. 4B.

The communication interface may include appropriate hardware (for example, a modem, network interface card, etc.) and software, including protocol conversion and data processing capabilities, to communicate through a LAN, WAN, or other communication system. The communication interface may include one or more ports, conversion software, or a combination of any of the preceding.

The processor may include any suitable device operable to execute instructions and manipulate data to perform operations for animal control device 402. The processor may include, for example, any type of central processing unit (CPU). The memory may include any computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server). The memory may comprise any other computer-readable tangible medium that is stored in cartridge 404, or a combination of any of the preceding. The output device may include any suitable device operable for displaying information to a user. The input device may include any suitable device operable to input, select, and/or manipulate various data and information.

Modifications, additions, or omissions may be made to animal control device 402 without departing from the scope of the disclosure. The components of animal control device 402 may be integrated or separated. Moreover, the operations of data animal control device 402 may be performed by more, fewer, or other components. For example, although cartridge 404 is displayed as inserted in a top portion of animal control device 402, cartridge 404 may be inserted in any suitable location and may be integrated in another suitable location, and the operations of animal control device 402 may be performed by more than one component. Further details of an example animal control device 402 and the operations of animal control device 402 are provided below with reference to FIG. 6.

Figure 4B:
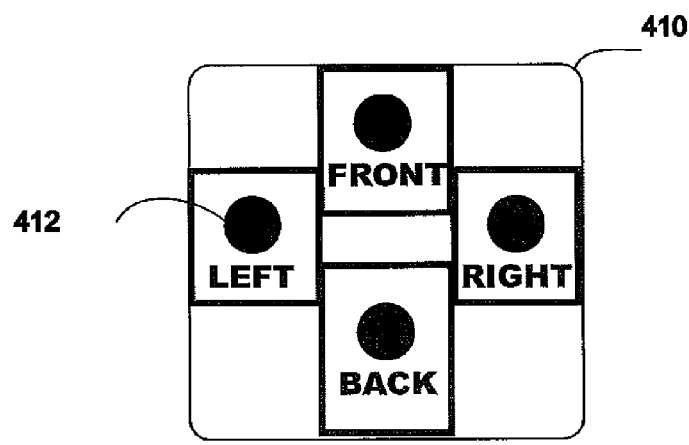
FIG. 4B illustrates one embodiment of an example animal communication interface, according to certain embodiments of the present disclosure.

FIG. 4B illustrates one embodiment of an example animal communication interface 410 according to certain embodiments of the present disclosure. Animal communication interface 410 may be implemented with a traditional animal control device, such as a leash as described below with reference to FIG. 5A. Animal communication interface 410 may include any suitable interface such as buttons or a touch screen interface for indicating a direction. For example, animal communication interface 410 may include several buttons with each button indicating a particular direction. In the example, an owner may select a button, such as button 412, to generate an indication of a left direction. The indication of the left direction may be communicated to an animal control device, according to certain embodiments of the present disclosure. As shown in the illustrated embodiment, animal communication interface 410 may include other corresponding buttons such as a front button, right button, and back button.

A component of animal communication interface 410 may include any suitable arrangement of elements, for example, an interface, logic, memory, other suitable element, or a combination of any of the preceding. Animal communication interface 410 may receive input, send output, process the input and/or output, perform other suitable operation, or perform a combination of any of the preceding. Certain embodiments of animal control interface 410 implemented with a leash and communicatively coupled with an animal control device are described below with reference to FIGS. 5A and 5B.

Figure 5A:
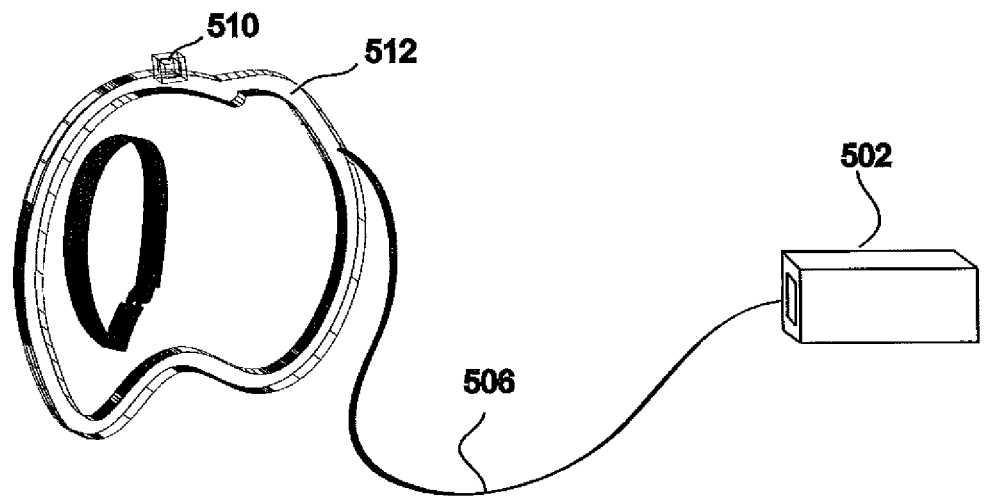
FIG. 5A illustrates one embodiment of an example animal control device with a wired connection to an animal communication interface, according to certain embodiments of the present disclosure.
Figure 5B:
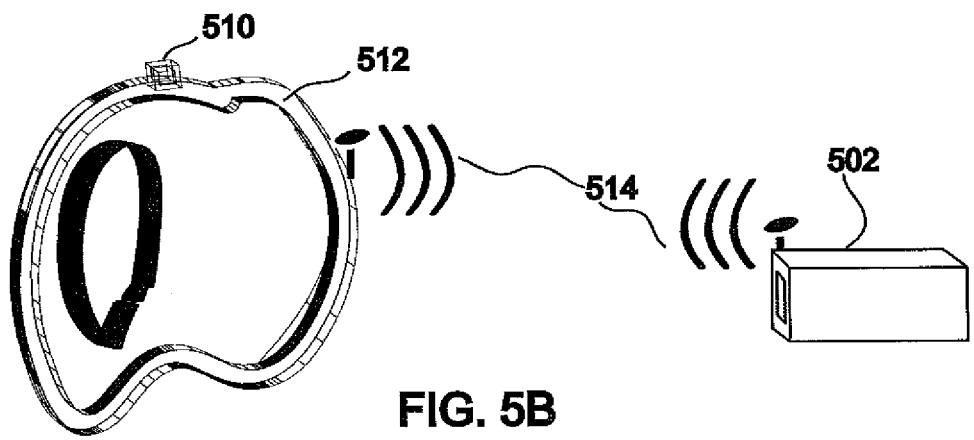
FIG. 5B illustrates one embodiment of an example animal control device with a wireless connection, according to certain embodiments of the present disclosure.

FIG. 5A illustrates one embodiment of an example animal control device 502 with a wired connection 506 to an animal communication interface 510 attached to a leash 512 and FIG. 5B illustrates one embodiment of an example animal control device with a wireless connection 514, according to certain embodiments of the present disclosure. Animal control device 502 may be substantially similar to animal control device 302 of FIG. 3 and animal control device 402 of FIG. 4A. Animal communication interface 510 may be substantially similar to animal communication interface 410 of FIG. 4B. Animal control device 502 may be communicatively coupled to animal communication interface 510 via a network, according to one embodiment. The network may facilitate transfer data, indications of direction, and commands over a wireless or wireline communication. The network may communicate, for example, IP packets, Frame Relay frames, Asynchronous Transfer Mode (ATM) cells, voice, video, data, and other suitable information between network addresses. The network may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, animal control device 502 may be communicatively coupled to other suitable devices including a data collection server and other remote devices including other animal control devices 502.

Figure 5C:
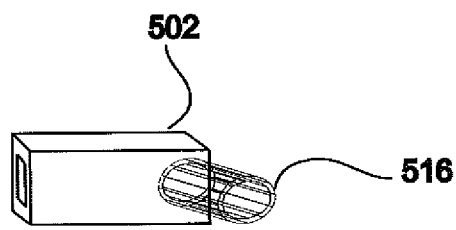
FIG. 5C illustrates one embodiment of an example animal control device with a camera and speaker, according to certain embodiments of the present disclosure.

FIG. 5C illustrates one embodiment of an example animal control device 502 with a camera and speaker 516, according to certain embodiments of the present disclosure. Animal control device 502 may be substantially similar to animal control device 302 of FIG. 3 and animal control device 402 of FIG. 4A. In another example implementation of animal control device 502, animal control device 502 may utilize camera and speaker 516 to detect other animals in the area or oncoming animals. For example, another animal's motion or presence may be detected by camera and speaker 516 or via any other suitable sensor, such as by a motion sensor or other sensor configured to detect indicators of animal motion or presence, and may be incorporated into animal control device 502. By identifying a second animal in proximity to the first animal using camera and speaker 516, animal control device 502 may be operable to trigger a scent discharge in a direction away from the identified second animal to prevent the animals from crossing paths and a potential animal conflict.

Figure 6:
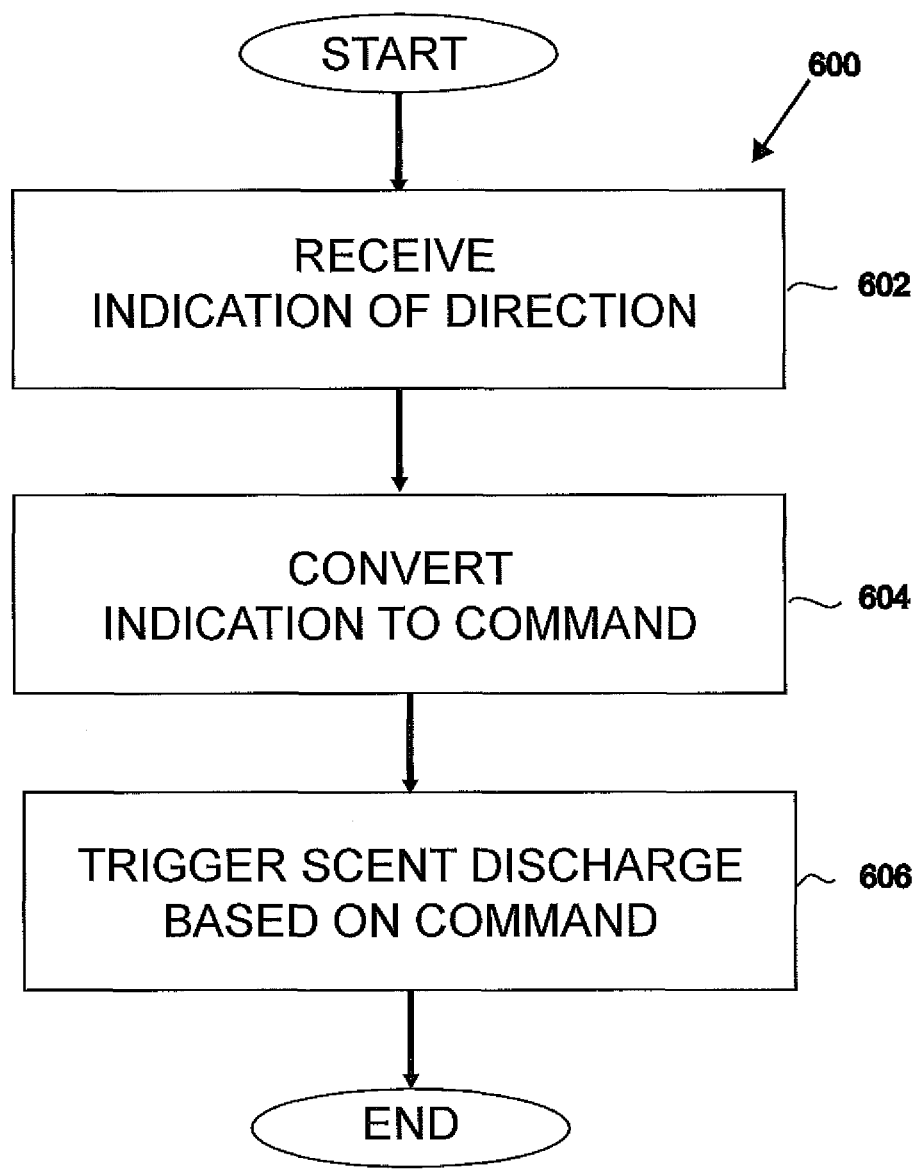
FIG. 6 illustrates an example method for animal control, according to certain embodiments of the present disclosure.

FIG. 6 illustrates an example method 600 for animal control, according to certain embodiments of the present disclosure. The method begins at step 602 where an indication of a direction is received at an animal control device. At step 604, the received indication of a direction is converted to a command. At step 606, at least a first scent discharge is triggered based on the command. The scent discharge includes a liquid mist having an odor that is distracting to at least a first animal. It should be understood that some of the steps illustrated in FIG. 6 may be combined, modified or deleted where appropriate, and additional steps may be added to the flowchart. Additionally, as indicated above, steps may be performed in any suitable order without departing from the scope of the disclosure.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:
1. A system for animal control, comprising:
   a leash;

an animal communication interface coupled to the leash and operable to generate an indication of a direction; and an animal control device comprising a processor and a non-transitory memory device, the animal control device coupled to the animal communication interface and operable to:

receive the indication of a direction;

convert the received indication of a direction to a command;

trigger at least a fire scent discharge comprising a liquid mist having an odor that is distracting to at least a first animal;

identify a second animal in proximity to the first animal; and trigger at least a second scent discharge in a direction away from the identified second animal.

2. The system of claim 1, wherein the odor comprises a bacon odor.

3. The system of claim 1, wherein the odor comprises a cheese odor.

4. The system of claim 1, wherein the odor comprises a hamburger odor.

* * * * *